United States Patent [19]

Todd et al.

[11] Patent Number: 5,444,133
[45] Date of Patent: Aug. 22, 1995

[54] PROCESS FOR PRODUCING POLYETHYLENE

[75] Inventors: William G. Todd, Victoria; Patrick A. Grimm, Bay City; Joe C. Daws, Victoria, all of Tex.

[73] Assignee: Occidental Chemical Corporation, Niagara Falls, N.Y.

[21] Appl. No.: 51,147

[22] Filed: Apr. 22, 1993

[51] Int. Cl.[6] .................. C08F 2/06; C08F 4/64; C08F 4/68
[52] U.S. Cl. .................. 526/116; 526/113; 526/114; 526/348.2; 526/352; 502/113
[58] Field of Search ............... 526/113, 114, 116, 352, 526/348.2

[56] References Cited

U.S. PATENT DOCUMENTS

| 4,246,383 | 1/1981 | Gessell | 526/92 |
|---|---|---|---|
| 4,440,869 | 4/1984 | Shannon et al. | 502/104 |
| 4,525,468 | 6/1985 | Mack et al. | 502/104 |
| 4,537,869 | 8/1985 | McDaniel | 502/107 |
| 4,603,183 | 7/1986 | Gessell | 526/124 |
| 4,704,376 | 11/1987 | Blenkers et al. | 502/104 |
| 4,739,022 | 4/1988 | Blenkers et al. | 526/116 |

Primary Examiner—David W. Wu
Attorney, Agent, or Firm—Wayne A. Jones; Richard D. Fuerle

[57] ABSTRACT

Disclosed is a method of making polyethylene wherein ethylene, a catalyst, a cocatalyst and a solvent are added to a reactor. A first mixture is formed of the ethylene and either the catalyst or the cocatalyst and a second mixture is separately formed of the solvent and the other of the catalyst or cocatalyst. These two mixtures are then combined in a reactor to produce the polyethylene.

17 Claims, 6 Drawing Sheets

PROCESS FOR PRODUCING POLYETHYLENE

BACKGROUND OF THE INVENTION

This invention relates to a process wherein a catalyst, a cocatalyst, a solvent, a monomer, a comonomer and hydrogen are added to a reactor to make polyethylene. In particular, it relates to that process where the catalyst and cocatalyst are kept separate until they are added to the reactor.

In a high pressure solution process for preparing polyethylene, the catalyst and cocatalyst are typically premixed in a small solvent stream (S1) outside of the reactor. This mixture (S1) and the main reactor feed stream (S2), which contains the remaining solvent, the monomer, and other reaction ingredients, are then separately added to a continuously stirred reactor. However, under certain production conditions of the reactor, it was difficult to control the temperature within the reactor. Specifically, the temperature within the reactor would fluctuate about 20° C. every three or four minutes. This cyclical change in temperature affected the physical properties of the resulting polyethylene resin. This change in physical properties caused a swing in the extruder nose pressure, which is a direct measurement of the polymer melt flow properties through the die plate. Because of the temperature swing, the amount of monomer being reacted varied also. This was directly reflected in the amount of unreacted monomer recycled back to the reactor. No one knew what was causing this problem or how this problem could be solved.

In addition, the catalyst and cocatalyst mix tees, where the catalyst and cocatalyst were mixed with solvent in S1, would periodically plug up with solids. A plant shutdown was required several times a year to clean them. This pluggage was caused by activated catalyst solids precipitating out onto the walls of the piping system.

SUMMARY OF THE INVENTION

We have discovered that when the catalyst and cocatalyst are not mixed together outside of the reactor, but are separately mixed with either the S1 or S2, most of the hereinabove described problems are eliminated or alleviated. In the method of this invention, the temperature within the reactor cycles only about 1° C. instead of the previous 20° C. As a result, the properties of the resin are much more uniform.

Very unexpectedly, we have found that polyethylene resin produced by the process of this invention also has a broader molecular weight distribution due to the formation of higher molecular weight polymers which were not present in product made by the previous process. These higher molecular weight polymers are expected to improve the melt strength of the product, which is an important property in blown film, blow molding and other applications.

Other chronic problems were also solved by the method of this invention. Solids are no longer generated in the catalyst and cocatalyst mixing tees and therefore it is no longer necessary to shut down the plant in order to clean clogged tees. Another unexpected benefit of this invention is the increased productivity of the feed line catalyst. We have found that when the process of this invention is used, the consumption of catalyst and cocatalyst is reduced by about 30 to about 50 wt %, which results in a substantial savings of catalyst, cocatalyst and other associated costs.

The drawings are more fully explained in the examples which follow.

DESCRIPTION OF THE PREFERRED EMBODIMENTS

Figure 1:
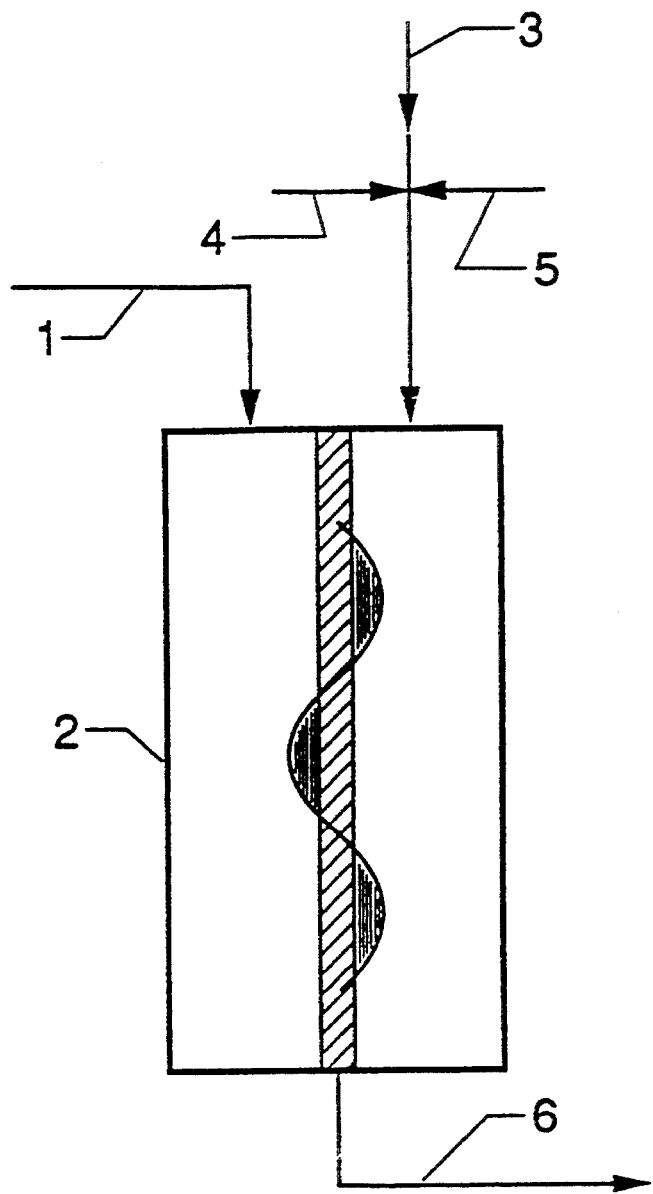
FIG. 1 is an illustration of a prior art method of making polyethylene.

In FIG. 1, which illustrates a prior art method of making polyethylene, solvent, monomer, comonomer, and hydrogen are fed through line 1 into reactor 2. Solvent is fed through line 3, catalyst through line 4, and cocatalyst through line 5, into reactor 2. Product leaves reactor 2 through line 6.

Figure 2:
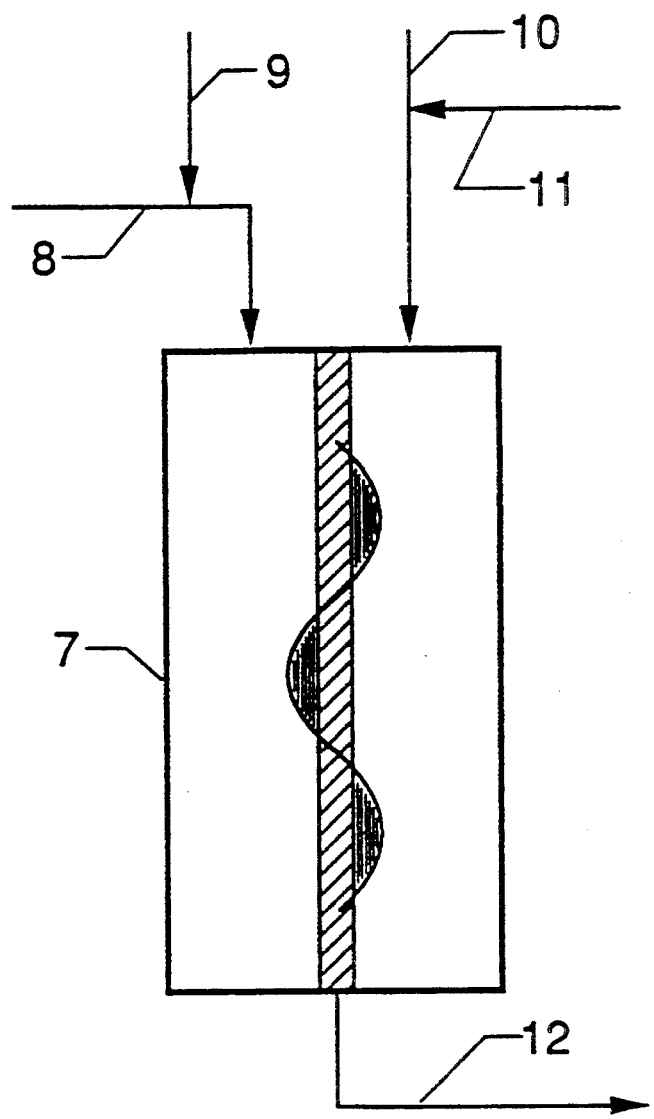
FIG. 2 is an illustration of the method of this invention for making polyethylene.

In FIG. 2, solvent, monomer, comonomer, and hydrogen enter reactor 7 through line 8. Catalyst is added in line 9, solvent in line 10, and cocatalyst in line 11. Product exits reactor 7 through line 12.

The process of this invention is applicable to high pressure solution processes for producing linear polyethylene. These processes involve the mixing of a catalyst, cocatalyst, a solvent, liquefied ethylene under pressure, and optional other monomers. A description of one such process can be found in U.S. Pat. No. 4,704,376, herein incorporated by reference.

In addition to liquefied high pressure ethylene, which typically constitutes about 5 to about 50 wt % of the total composition weight, a solvent for the ethylene and for the polyethylene product is required. Saturated liquid hydrocarbons from $C_4$ to $C_{12}$, such as butane, pentane, hexane, heptane, octane, nonane, decane, or dodecane, or mixtures thereof, are suitable as solvents. The preferred solvent is normal hexane as it has been found to work well in the process of this invention. About 50 to about 95 wt % of the total composition weight can be solvent.

About 1 to about 50 ppm (by weight) based on total reaction composition weight of an ethylene polymerization catalyst is also required for the reaction. Examples of suitable catalysts include titanium tetrachloride, titanium trichloride, vanadium oxychloride, vanadium tetrachloride, and mixtures of the above. The most suitable catalysts are mixtures of titanium and vanadium halides, particularly chlorides. We have found that the best catalyst is a mixture of vanadium oxytrichloride ($VOCl_3$) and titanium tetrachloride ($TiCl_4$). The weight ratio of titanium to vanadium in the mixture should be about 5 to 1 to about 1 to 5.

A cocatalyst, which reacts with and activates the catalyst, is also required. Examples of cocatalysts include triethylaluminum, tributylaluminum, trihexylaluminum, trioctylaluminum, triisopropylaluminum, and mixtures of the above. Cocatalysts have the formula $R_3Al$, where $R_3$ is alkyl from $C_2$ to $C_{20}$. A second class of cocatalysts of general formula $R_2AlX$ where X is chlorine, bromine or—$OSiR_3$ could also be used. The preferred cocatalyst is triethylaluminum. About 1 to about 50 ppm (by weight) of a cocatalyst can be included based on total composition weight.

In order to control various properties of the resulting polyethylene, it may be desirable to include other monomers in the composition. For example, α-alkenes are preferably included to reduce the density of the polyethylene and increase its impact strength. Examples of such α-alkenes include 1-propene, 1-butene, 1-pentene, 1-hexene, 1-heptene, 1-octene, 1-nonene, and 1-decene. The preferred α-alkene is 1-octene as it has been found to work well. About 2 to about 50 wt % of the total composition weight can be other monomer.

Although hydrogen can be omitted from the reacting composition, it is normally and desirably present to control and reduce the molecular weight by acting as a chain terminator. About 2 about 500 ppm (by weight) hydrogen can be included based on the total composition weight.

In the prior art process, two separate mixtures, S1 and S2, were prepared prior to adding the components to the reactor. The first mixture, S1, consisted of a small solvent stream mixed with the catalyst and the cocatalyst, and the second mixture, S2, consisted of the solvent, ethylene, hydrogen, and any comonomers. In the process of this invention, two separate mixtures are also prepared prior to the addition of the components to the reactor, but the catalyst is in one mixture and the cocatalyst is in the other mixture. Thus, the catalyst and the cocatalyst never see each other until the mixtures of which they are part are combined in the reactor. While the catalyst and the cocatalyst can be added to either S1 or S2, it is preferable to add the catalyst to S2 and the cocatalyst to the S1. Thus, S2 would contain the solvent, ethylene, optional comonomers, hydrogen, and the catalyst, and S1 would contain solvent and the cocatalyst. The two mixtures are then combined in a reactor. As is known in the art, it is possible to use more than one reactor and the output of the first reactor can be sent to a second reactor where additional reaction components are added. If this is done, the catalyst and the cocatalyst should be kept separate prior to their addition to the second reactor. Similarly, the components can be added to two different reactors and the output of those two reactors can be combined in a third reactor. If that reaction scheme is used, the catalyst and cocatalyst are kept separate before they are added to each reactor. The various reactor combinations and the operating conditions of these reactors are well-known in the art.

The pressure in the reactor should be about 1200 to about 3400 psi as, at lower pressures, ethylene gas may come out of solution and higher pressures are unnecessary. The reactor temperature should be about 130° to about 300° C. At lower temperatures the polyethylene may come out of solution and at higher temperatures decomposition could occur. The reaction time is about 30 to about 100 seconds; shorter times and longer times may result in undesirable properties.

The product of the reaction is a linear polyethylene which generally has a density of about 0.90 to about 0.97 g/cc and a melt index of 0.20 to about 300 g. per 10 minutes. This polyethylene has a broader molecular weight distribution (MWD) than polyethylene made by the prior process, as indicated by its viscosity. A higher viscosity at a low shear rate demonstrates the presence of higher molecular weight species in the product of this invention. These higher molecular weight species enhance the melt flow characteristics that are important in blown film bubble stability and blow molding swell properties.

The product can be used to cast films for application as sanitary overwraps, to blow films which are used in food packaging, as injection resins which are also used in food packaging, and for other applications.

The following examples further illustrate this invention.

EXAMPLE 1—PRIOR ART

Stream S1, consisting of 2000 pph of solvent, 9.8 pph of cocatalyst and 6.58 pph of catalyst, was added to the reactor at 60° C. as illustrated in FIG. 1. Stream S2, consisting of 80,000 pph of liquified ethylene, 210,000 pph of solvent, and 4.29 pph hydrogen at 60° C., was added to the reactor. The stirred reactor had 750 gallons of volume and was operated at 250° C. and 2700 psig. Reactor hold-up time was about 60 seconds and about 43,000 pph of polymer was produced. Total catalyst and cocatalyst demand was 16.38 pph.

The low-shear viscosity and elasticity (recoverable compliance) were obtained from a Rheometrics Stress Rheometer (RSR) at 160° C. The lower melt temperature was required in order to achieve good measurement sensitivity, since the normal procedure was optimized for fractional melt resins. The following test parameters were used:

Geometry: Parallel plates, 25 mm diameter, 2.0 mm gap
Atmosphere: Nitrogen purge
Time: 400 sec in creep; 400 sec in recovery
Stress Levels: 2000, 20000 dynes/cm$^2$
Calculations:

$$\text{Viscosity} = \frac{\text{Stress}}{\text{Slope of Creep Curve between 300–400 sec}}$$

$$\text{Recoverable Compliance} = \frac{\text{Strain after 798 sec. Recovery}}{\text{Stress}}$$

Reactor Temperature °C., unreacted recycle monomer, pph, and extruder nose pressure, psig, were monitored during this run.

Figure 3:
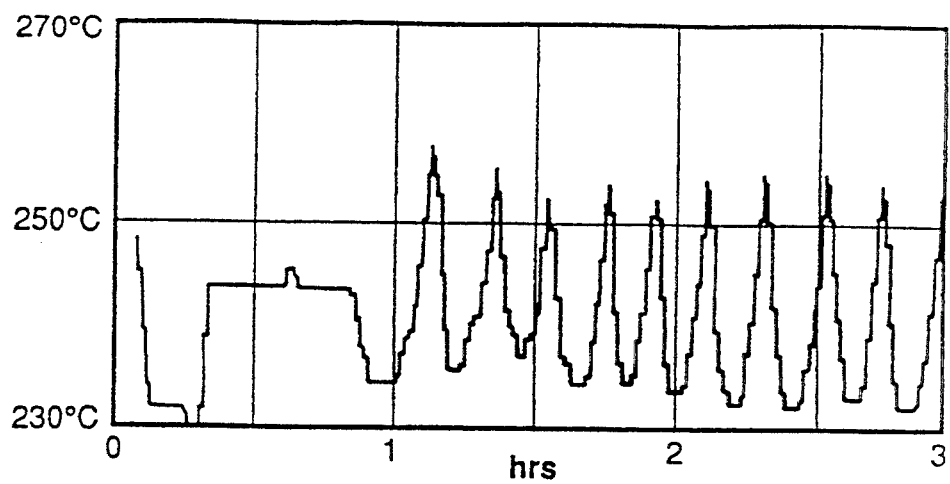
FIG. 3 is a graph showing reactor temperature versus time in hours (hrs) for a polyethylene production run according to the prior art.
Figure 4:
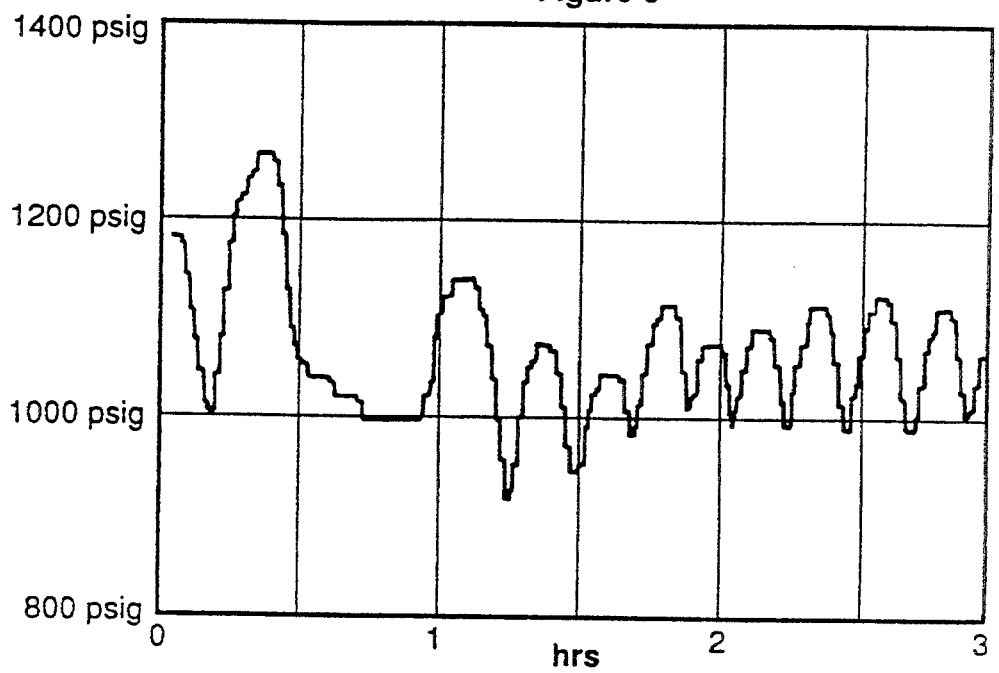
FIG. 4 is a graph showing the extruder nose pressure versus time in hours (hrs) for a polyethylene production run according to the prior art.
Figure 5:
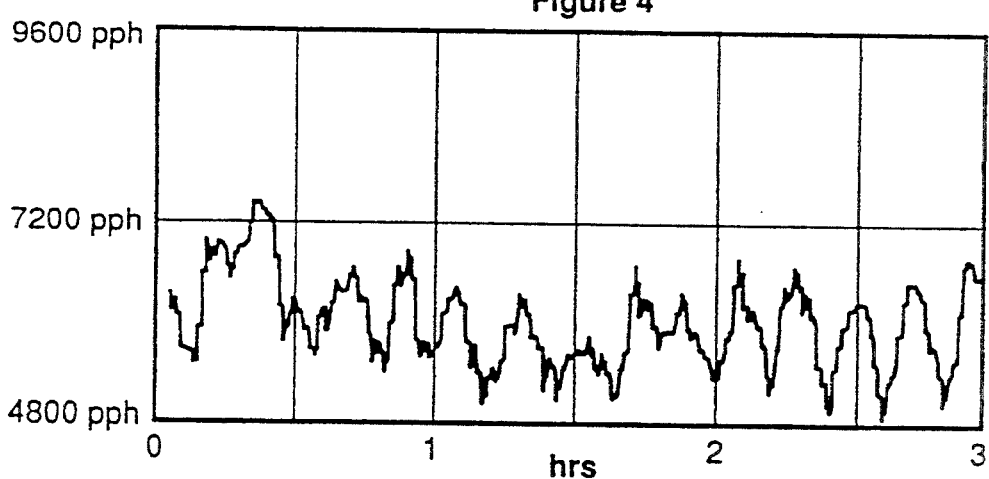
FIG. 5 is a graph showing the recycle monomer flow rate in pounds per hour (pph) versus time in hours (hrs) for a polyethylene production run according to the prior art.

FIGS. 3, 4 and 5 give the results of this experiment. FIG. 3 shows the temperature of reactor, FIG. 4 shows the exterior nose pressure of extruder and FIG. 5 shows the recycle monomer flow rate. FIG. 3 shows that the temperature within the reactor fluctuated over 20° C. during the reaction. Neither the temperature, the nose pressure, nor the recycle monomer flow rate was steady, which indicates that the polyethylene produced was not of a uniform composition.

EXAMPLE 2—METHOD OF THIS INVENTION

Figure 6:
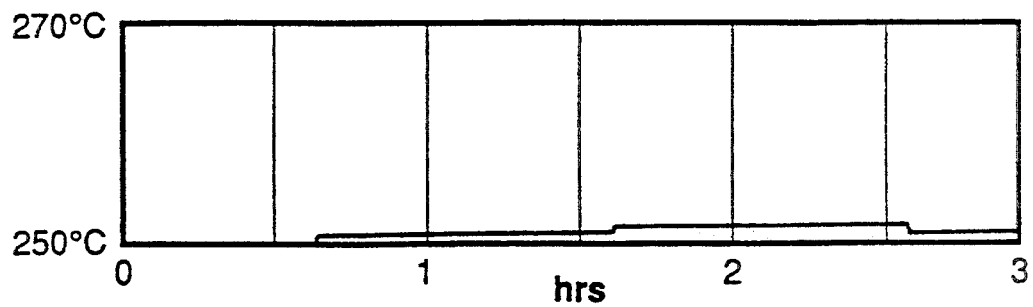
FIG. 6 is a graph showing reactor temperature versus time for the method of this invention.
Figure 7:
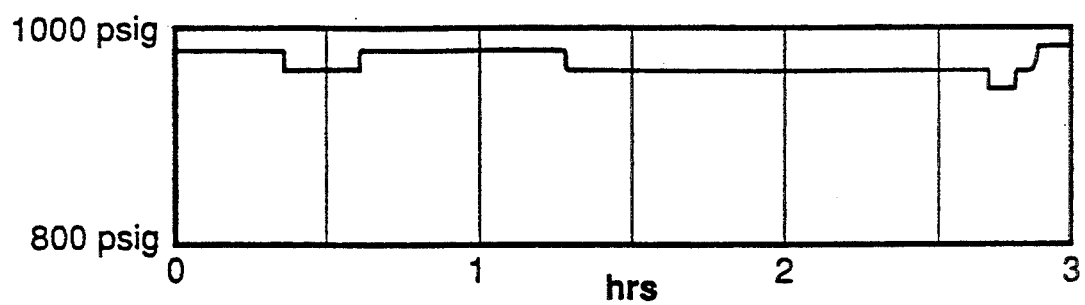
FIG. 7 is a graph showing the extruder nose pressure versus time for the method of this invention.
Figure 8:
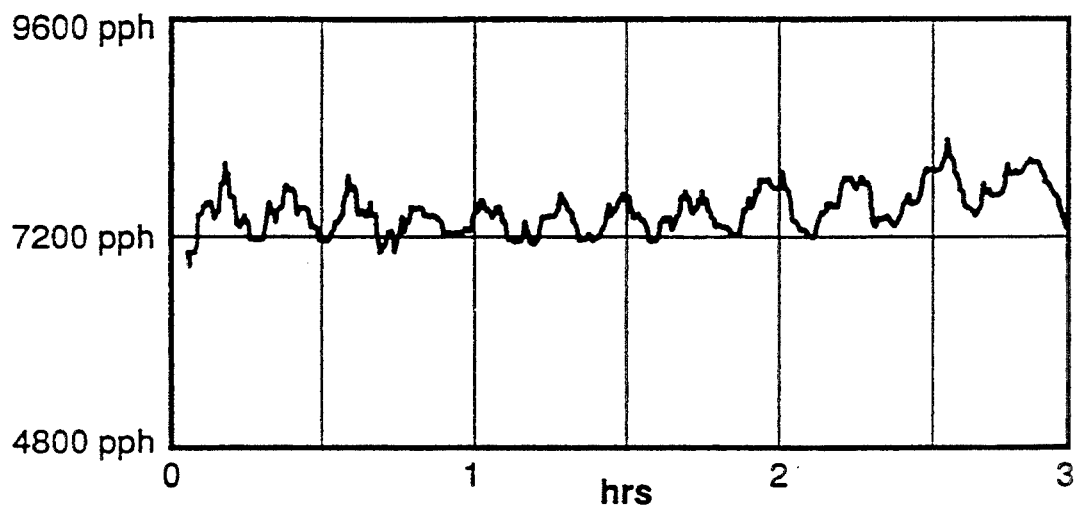
FIG. 8 is a graph showing the recycle monomer flow rate versus time for the method of this invention.

Example 1 was repeated, except that only cocatalyst was mixed in stream S1 going to the reactor and the catalyst was mixed into stream S2. Flow rates, temperatures and compositions were the same as in Example 1. The amount of polymer produced was 41,500 pph. Required cocatalyst flow to maintain the reactor temperature of 250° C. was 5.80 pph. Required catalyst flow was 4.09 pph. Total catalyst and cocatalyst was 9.89 pph. The lower catalyst and cocatalyst demand in Example 2 demonstrates the higher catalyst productivity using the method of this invention. Reactor temperature, extruder nose pressure and unreacted recycled monomer were again monitored and are illustrated in FIGS. 6, 7 and 8, respectively.

Examples 1 and 2 illustrated the differences in reactor temperature, extruder nose pressure and unreacted recycled monomer between the prior art method and the method of this invention. As the data show, reactor temperature, extruder nose pressure and recycled monomer in Example 2 became steady as compared to the unsteady state in Example 1. The method of this invention clearly eliminated variation in reactor operation.

EXAMPLE 3—COMPARATIVE EXAMPLE

Figure 9:
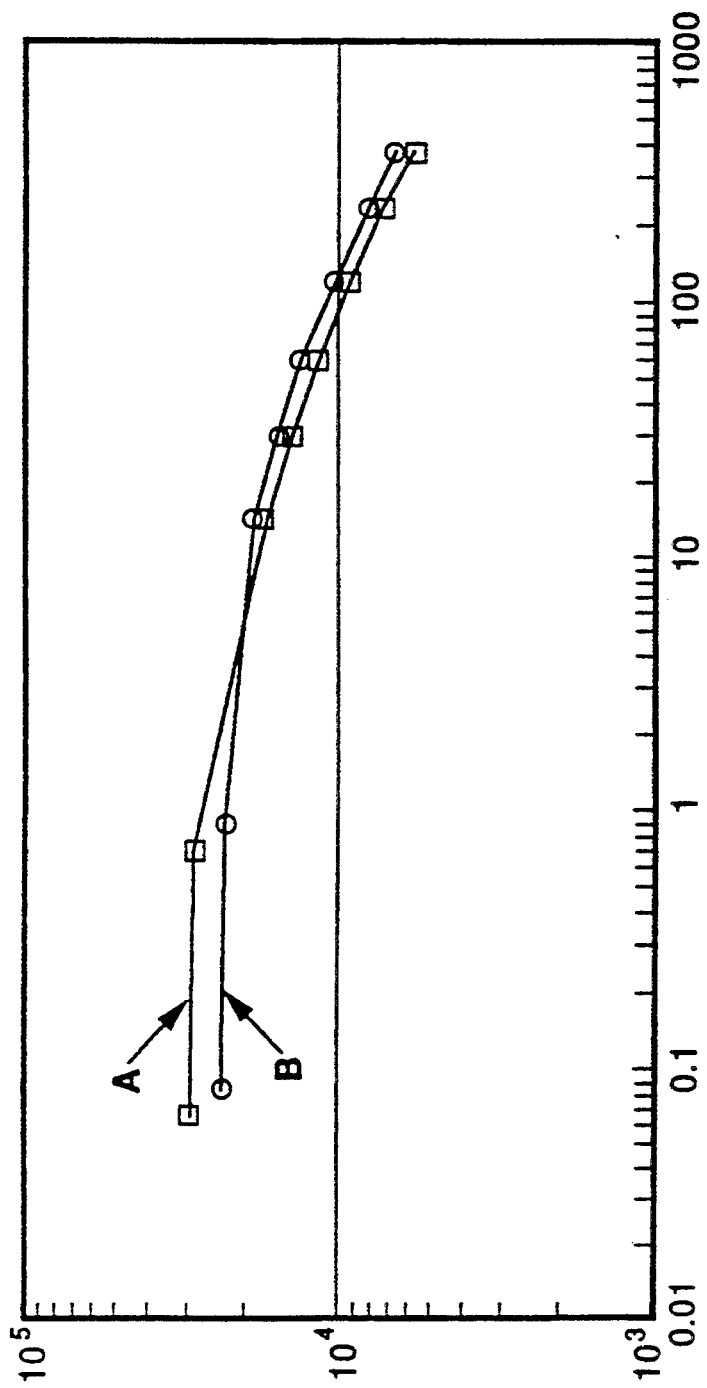
FIG. 9 is a graph showing the viscosity in poise versus shear rate in 1/sec for resins produced according to the method of this invention (A) and according to the prior art method (B).

The viscosity vs. shear rate was measured for the products of Examples 1 and 2. FIG. 9 presents this data and shows that the resin prepared according to this invention (A) has a steeper slope than the resin prepared by the prior art method (B), which indicates that the resin prepared according to this invention has a broader molecular weight distribution. FIG. 9 also shows that the two curves intersect, which shows that, at low shear rates, the resin prepared according to this invention (A) is more viscous than the resin prepared according to the prior art method (B). This is a desirable property in blow molding, and blown film, where the strength from higher molecular weight species is needed at low shear rates. At higher shear rates, on the other hand, the resin prepared according to this invention is less viscous. This is a desirable property in injection molding, where the resin is subjected to high shear, since a lower viscosity means a higher throughput. FIG. 9 demonstrates that the two resins are different and, in particular, that the resin of this invention contains more high molecular weight species. Melt viscosity data were measured on a Kayeness Capillary Rheometer at 190° C. using an orifice of radius 0.015 inches and L/D=33 for the shear rate range 10–3000 sec$^{-1}$, and with an orifice of radius 0.0125 inches, l/D=25 for the shear rate range up to 10000 sec$^{-1}$.

EXAMPLE 4—COMPARATIVE EXAMPLE

Figure 10:
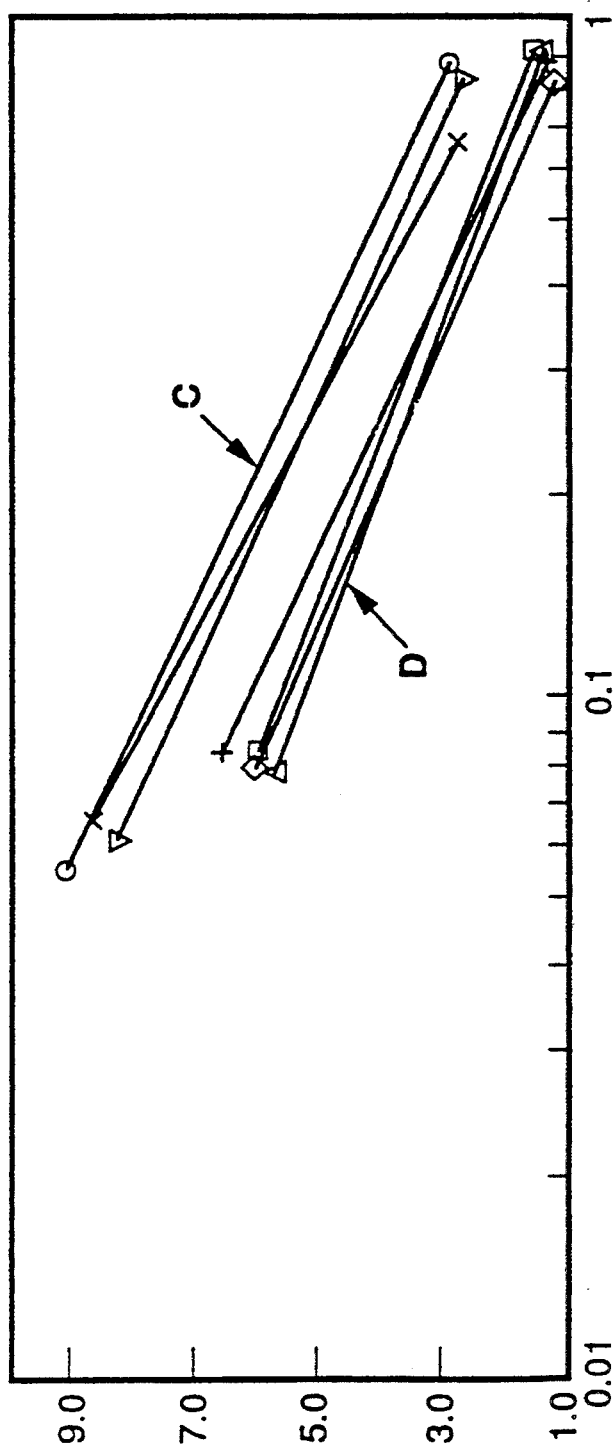
FIG. 10 is a graph of recoverable compliance in square cm/dyne $1 \times 10^{-5}$ versus shear rate in 1/sec for resins produced according to the method of this invention.

Examples 1 and 2 were repeated in lots of 185,000 pounds of polymer produced. For the process of this invention 3 lots were prepared, and for the prior art process 4 lots were produced. FIG. 10 shows that polyethylene produced according to the process of this invention (C) had a higher recoverable compliance (higher viscosity) at lower shear rates than polyethylene produced according to the prior process (D), which demonstrates the presence of higher molecular weight species.

EXAMPLE 5—PRIOR ART

Stream S1, consisting of 2000 pph of solvent, 7.56 pph of catalyst and 7.71 pph of cocatalyst at 62° C., was added to the reactor. Stream S2, consisting of 18,000 pph of liquified ethylene, 150,000 pph of solvent, 8000 pph of octene-1 and 15.3 pph of hydrogen at 62° C., was added to the reactor. The stirred reactor had 750 gallons of volume and was operated at 145° C. and 2600 psig. Reactor hold-up time was 96 seconds and about 20,000 pph of polymer was produced.

EXAMPLE 6—METHOD OF INVENTION

Example 5 was repeated, except only cocatalyst was added to Stream S1 going to the reactor and catalyst was added to Stream S2 before it entered the reactor. Flow rates, temperature, and compositions were the same as Example 5 and the amount of polymer produced was the same. Required cocatalyst flow to maintain the reactor temperature was 3.74 pph. Required catalyst flow was 3.04 pph.

The reactor temperature in Examples 1 and 2 was 250° C. The reactor temperature in Examples 7 and 8 was 145° C. This illustrates that the method of this invention is capable of working over a wide range of reactor temperatures.

Total catalyst and cocatalyst in Example 5 was 15.27 pph. Total catalyst and cocatalyst in Example 6 was 6.78 pph. The lower catalyst and cocatalyst demand in Example 6 demonstrates the higher catalyst productivity using the method of this invention.

Comonomer was not added in Examples 1 and 2 but was added to Examples 5 and 6. This demonstrates the operability of the method of this invention with and without comonomer present.

We claim:

1. In a high pressure solution process for making polyethylene or a copolymer of ethylene and an $\alpha$-alkene from $C_3$ to $C_{10}$ wherein ethylene, a catalyst of a mixture of titanium and vanadium halides or oxyhalides, a cocatalyst having the formula $R_3Al$ or $R_2AlX$, where R is alkyl from $C_2$ to $C_{20}$ and X is chlorine, bromine, or —$OSiR_3$, and a solvent are added to a reactor, the improvement comprising forming a first mixture which consists essentially of said ethylene and said solvent and a second mixture which consists essentially of said solvent, including all of said catalyst in one of said mixtures and all of said cocatalyst in the other of said mixtures, and keeping said first and second mixtures apart until they have been added to said reactor.

2. A method according to claim 1 wherein said catalyst is included in said first mixture and said cocatalyst is included in said second mixture.

3. A method according to claim 1 wherein said $\alpha$-alkene from $C_3$ to $C_{10}$ is included in said first mixture.

4. A method according to claim 3 wherein said $\alpha$-alkene is 1-octene.

5. A method according to claim 1 wherein hydrogen is included in said first mixture.

6. A method according to claim 1 wherein said cocatalyst is included in said first mixture and said catalyst is included in said second mixture.

7. A method according to claim 6 wherein hydrogen and said $\alpha$-alkene from $C_3$ to $C_{10}$ is included in said first mixture.

8. A method according to claim 1 wherein said reaction is at a pressure of about 1200 to about 3400 psi and a temperature of about 130° to about 300° C.

9. A method according to claim 1 wherein said catalyst is a mixture of vanadium oxytrichloride and titanium tetrachloride in a weight ratio of titanium to vanadium of about 5 to 1 to about 1 to 5.

10. A method according to claim 1 wherein said cocatalyst is triethylaluminum.

11. A high pressure solution process for making a copolymer of ethylene with an α-alkene from $C_3$ to $C_{10}$ consisting essentially of
   (A) forming a first mixture consisting essentially of
      (1) about 5 to about 95 wt % ethylene;
      (2) about 2 to about 50 wt % αalkene from $C_3$ to $C_{10}$;
      (3) about 2 to about 500 ppm hydrogen;
      (4) about 1 to about 50 ppm of a mixture of titanium and vanadium halides or oxyhalides; and
   (B) forming a second mixture consisting essentially of
      (1) about 50 to about 95 wt % saturated liquid hydrocarbon solvent from $C_4$ to $C_{12}$; and
      (2) about 1 to about 50 ppm of a cocatalyst having the formula $R_3Al$ or $R_2AlX$, where R is alkyl from $C_2$ to $C_{20}$ and X is chlorine, bromine, or —$OSiR_3$; (C) combining said first mixture with said second mixture in a reactor; and (D) reacting said mixture in said reactor to produce said copolymer.

12. A method according to claim 11 wherein said α-alkene from $C_3$ to $C_{10}$ is 1-octene.

13. A method according to claim 11 wherein said catalyst is a mixture of titanium tetrachloride and vanadium oxytrichloride in a titanium to vanadium weight ratio of about 5 to 1 to about 1 to 5.

14. A method according to claim 11 wherein said solvent is hexane.

15. A method according to claim 11 wherein said cocatalyst is triethylaluminum.

16. A method according to claim 11 wherein said reaction is at a pressure of about 1200 to about 3400 psi and a temperature of about 130° to about 300° C.

17. A high pressure solution process for making a linear copolymer of ethylene and 1-octene having a density of about 0.90 to about 0.97 g/cc and a melt index of 0.20 to about 300 g per 10 minutes consisting essentially of:
   (A) forming a first mixture consisting essentially of
      (1) about 5 to about 50 wt % liquified high pressure ethylene;
      (2) about 2 to about 50 wt % 1-octene;
      (3) about 2 to about 500 ppm hydrogen; and
      (4) about 1 to about 50 ppm of a catalyst consisting essentially of vanadium oxytrichloride and titanium tetrachloride in a weight ratio of titanium to vanadium of about 5 to 1 to about 1 to 5;
   (B) forming a second mixture consisting essentially of
      (1) about 50 to about 95 wt % hexane; and
      (2) about 1 to about 50 ppm triethylaluminum;
   (C) separately adding said first and second mixtures to a reactor; and (D) reacting said first and second mixtures in said reactor at a pressure of about 1200 to about 3400 psi and a temperature of about 130° to about 300° C. for about 30 to about 100 seconds.

* * * * *